United States Patent
Verneuil

(10) Patent No.: US 8,567,001 B2
(45) Date of Patent: Oct. 29, 2013

(54) VEHICLE WINDSHIELD WIPER MOTOR HAVING MULTIPLE ATTACHMENT POINTS, AND MOUNTING STRUCTURE FOR SAID MOTOR

(75) Inventor: Pascal Verneuil, Chevreuse (FR)

(73) Assignee: Renault S.A.S., Boulogne-Billancourt (FR)

( * ) Notice: Subject to any disclaimer, the term of this patent is extended or adjusted under 35 U.S.C. 154(b) by 292 days.

(21) Appl. No.: 13/002,587

(22) PCT Filed: Jul. 6, 2009

(86) PCT No.: PCT/FR2009/051323
§ 371 (c)(1),
(2), (4) Date: Mar. 25, 2011

(87) PCT Pub. No.: WO2010/001076
PCT Pub. Date: Jan. 7, 2010

(65) Prior Publication Data
US 2011/0278964 A1    Nov. 17, 2011

(30) Foreign Application Priority Data
Jul. 4, 2008  (FR) ..................................... 08 03804

(51) Int. Cl.
*B60S 1/02*    (2006.01)
*B60S 1/04*    (2006.01)

(52) U.S. Cl.
USPC .................... 15/250.31; 248/316.6; 248/230.5

(58) Field of Classification Search
USPC ............ 310/91; 15/250.3, 250.31; 248/230.5, 248/316.6
See application file for complete search history.

(56) References Cited

U.S. PATENT DOCUMENTS

| | | | |
|---|---|---|---|
| 5,396,681 A * | 3/1995 | Hara | 15/250.31 |
| 5,956,800 A * | 9/1999 | Morin et al. | 15/250.31 |
| 6,343,403 B1 | 2/2002 | Kanazawa | |
| 6,367,870 B1 | 4/2002 | Muehlpforte et al. | |
| 6,375,136 B1 * | 4/2002 | Bruemmer et al. | 248/200 |
| 2006/0156502 A1 | 7/2006 | Walther et al. | |

FOREIGN PATENT DOCUMENTS

| | | |
|---|---|---|
| DE | 198 20 798 | 11/1999 |
| DE | 10 2006 027 603 | 12/2007 |
| DE | 10 2006 060 321 | 6/2008 |
| FR | 2 721 883 | 1/1996 |

OTHER PUBLICATIONS

International Search Report issued Nov. 12, 2009 in PCT/FR09/051323 filed Jul. 6, 2009.

* cited by examiner

*Primary Examiner* — Burton Mullins
(74) *Attorney, Agent, or Firm* — Oblon, Spivak, McClelland, Maier & Neustadt, L.L.P.

(57) ABSTRACT

A vehicle windshield wiper motor including an output shaft and an attachment device for attaching a mounting structure onto a tube, the attachment device including an attachment base and a plate. The base includes at least five attachment members for attaching parallel rods therebetween, three attachment members forming a first group being spaced around the output shaft of the motor, and two attachment members forming a second group being placed at a sufficient distance from at least one of the three attachment members of the first group to form a cavity capable of holding the tube, the cavity being closable by the plate. A mounting structure can mount such a windshield wiper motor.

10 Claims, 2 Drawing Sheets

VEHICLE WINDSHIELD WIPER MOTOR HAVING MULTIPLE ATTACHMENT POINTS, AND MOUNTING STRUCTURE FOR SAID MOTOR

BACKGROUND

The invention relates to a vehicle windshield wiper motor equipped with a mount having multiple attachment points, and to a supporting structure for said motor.

Vehicle windshield wiper mechanisms are driven by a motor. This motor is provided with a mount for fastening it to a tube which acts as a rigid structure of the windshield wiper mechanism. This mount may be fastened to the tube in various ways: either it is fastened to the tube using a mounting plate secured to the tube by means of three screw/nut assemblies distributed 120° apart about the output shaft of the motor, or it is fastened directly to the tube. These two modes of attachment currently entail distinct designs of motor mount, which means producing a different motor for each mode of attachment thus increasing the cost of manufacture of these motors.

BRIEF SUMMARY

The invention aims to alleviate these disadvantages by proposing a windshield wiper motor equipped with a mount that has multiple attachment points allowing a choice of direct fastening onto a structural tube or indirect fastening using a mounting plate.

To this end, the subject of the present invention is a vehicle windshield wiper motor comprising an output shaft and equipped with a device for fastening it onto a tube of a supporting structure, said fastening device comprising a fastening mount and a mounting plate, characterized in that the mount is provided with at least five fasteners with mutually parallel axes, at least three of these fasteners, which form a first group, being distributed about the output shaft of the motor, and at least two of these fasteners, which form a second group, being arranged a sufficient distance from at least one of the three fasteners of the first group to form a housing able to house said tube, said housing being able to be closed by the mounting plate.

Advantageously, the housing is defined by the space formed between two fasteners of the first group and two fasteners of the second group.

The fasteners of the two groups will, for example, be arranged in such a way as to face one another across the tube inserted in the housing.

According to a first embodiment, the mounting plate, distinct from the tube of the supporting structure, is able to be fastened at least at one point to the supporting structure and is fastened to the mount by means of at least two fasteners of the second group and at least one fastener of the first group so as to close said housing that accepts said tube.

Thus the mounting plate is fastened to the mount by means of fasteners situated on each side of the housing intended to accept the tube.

The tube cannot therefore escape from the housing.

Advantageously, the mounting plate is fastened to the mount by means of at least two fasteners of the second group and at least one fastener of the first group situated on the opposite side of the motor output shaft to the housing.

Advantageously, when the tube is in the housing, the mounting plate is fastened to the mount by means of fasteners situated on each side of the group of elements comprising the tube and the motor output shaft.

For example, the mounting plate will be fastened using two fasteners of the second group and one fastener of the first group.

Advantageously, that part of the mounting plate that closes the housing has a shape that complements the shape of the tube.

The mounting plate thus supplies pressure to the tube allowing the tube to be indexed in its housing and wedged therein.

According to a second embodiment, the mounting plate, secured to the tube of the supporting structure, is fastened to the mount by means of at least three fasteners of the first group.

Advantageously, the mounting plate is provided with an orifice through which the motor output shaft, possibly fitted with a crank pin, can pass.

The mounting plate can therefore be mounted even when the motor output shaft already has its crank pin fitted.

The fasteners are then, for example, distributed around this orifice. For example, three fasteners may be provided, distributed 120° apart around the orifice.

Advantageously, the fasteners are molded as an integral part of the mount.

These fasteners for example take the form of hollow shafts with an internal screw thread into which screws can be screwed.

Advantageously, those fasteners of the first and second groups that delimit said housing for the tube are tapered allowing the tube to be indexed in said housing and secured therein through a wedging effect.

The invention also relates to a supporting structure for a windshield wiper motor according to the invention, said structure comprising a tube distinct from the motor mounting plate, the tube comprising embossings of shapes that complement the fasteners of the motor housing designed to accept it.

BRIEF DESCRIPTION OF THE DRAWINGS

The invention is now described with reference to the accompanying nonlimiting drawings in which.

DETAILED DESCRIPTION

Figure 1:
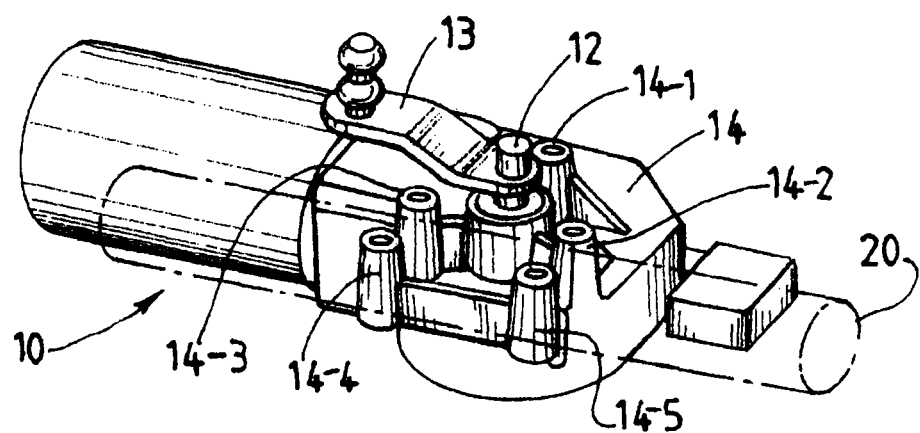
FIG. 1 is a perspective view of a windshield wiper motor according to the invention.

FIG. 1 depicts a vehicle windshield wiper motor 10 comprising an output shaft 12 and equipped with a device for fastening the motor onto a tube 20 of a supporting structure.

Figure 2:
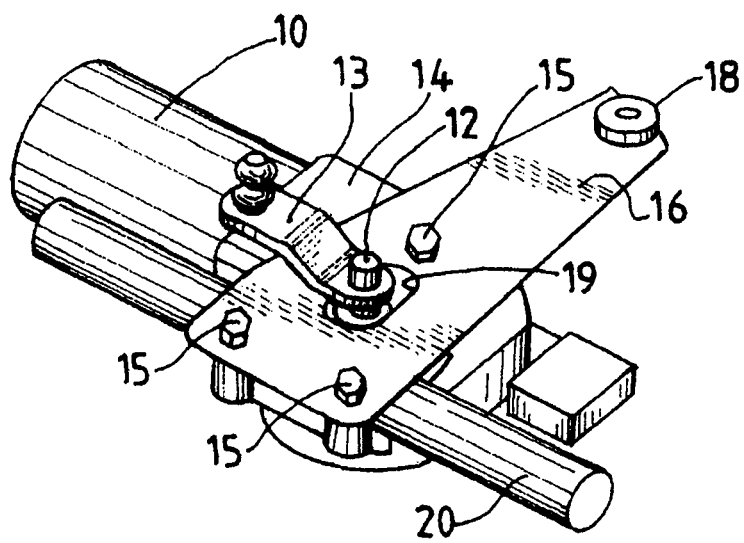
FIG. 2 is a perspective view of a motor fastened to a supporting structure according to a first embodiment of the invention.
Figure 4:
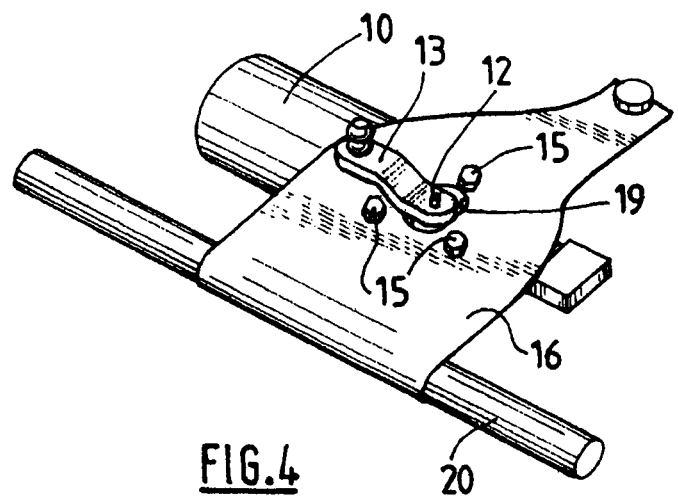
FIG. 4 is a perspective view of a motor fastened to a supporting structure according to a second embodiment of the invention.

The fastening device comprises a fastening mount 14 and a mounting plate 16 (FIGS. 2 and 4).

In the example depicted in FIG. 1, the mount 14 is provided with five fasteners 14-1 to 14-5 with parallel axes for fastening the mounting plate 16 to the mount. When the mounting plate is fastened, these axes run perpendicular to the mounting plate. Advantageously, these axes are parallel to the output spindle 12 of the motor.

In this example, the fasteners are hollow shafts which have been internally tapped so that screws 15 can be screwed into them.

Three fasteners 14-1 to 14-3 form a first group. These fasteners 14-1, 14-2, 14-3 are distributed about the output shaft 12 of the motor, for example at 120° apart.

The other two fasteners 14-4 and 14-5 form a second group. These two fasteners 14-4 and 14-5 are arranged a sufficient distance from at least one of the three fasteners of the first group that they form a housing for the tube 20 of the supporting structure.

In the example depicted, the housing is defined by the space formed between the two fasteners 14-2, 14-3 of the first group and the two fasteners 14-4 and 14-5 of the second group.

FIG. 1 shows that the fasteners 14-2 and 14-3 are symmetric with the fasteners 14-5 and 14-4 respectively, with respect to the axis of the tube 20 when the latter is in place between the fasteners 14-2 and 14-5 on the one hand and 14-3 and 14-4 on the other hand.

In the example, the fasteners are arranged in such a way that the tube 20 runs substantially parallel to the motor when inserted in its housing.

According to a first embodiment depicted in FIG. 2, the mounting plate 16, distinct from the tube 20 of the supporting structure, is able to be fastened at least at one point 18 to the supporting structure and is fastened to the mount 14 by means of at least two fasteners of the second group and at least one fastener of the first group so as to close the housing for accepting the tube 20.

In the example of FIG. 2, the mounting plate 16 is fastened to the mount by means of the two fasteners 14-4 and 14-5 of the second group which are situated furthest toward the outside of the mount and one fastener 14-1 of the first group which is situated on the opposite side of the motor output shaft 12 to the housing. The fastening points of the mounting plate 16 are thus distributed about the output shaft 12 of the motor.

That part of the mounting plate 16 that closes the housing has a shape that complements the shape of the tube and this shape is, for example, produced by embossing. This complementary shape allows the tube to be indexed in the housing and wedged therein.

Figures 3A, 3B:
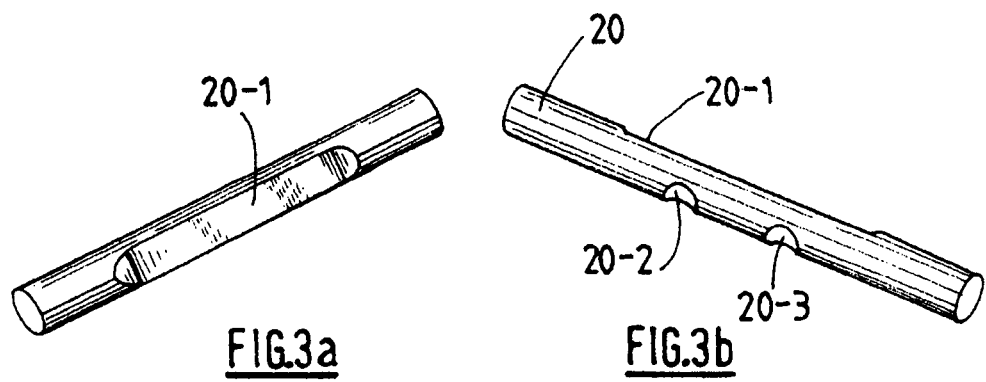
FIGS. 3a and 3b are perspective views of the tube that forms part of the supporting structure visible in FIG. 2.

Advantageously, the tube 20 of the supporting structure has embossings 20-1 to 20-3 of shapes that complement the fasteners of the housing designed to accept it, these embossings being depicted in FIGS. 3a and 3b.

In a second embodiment depicted in FIG. 4, the mounting plate 16 is secured to the tube 20 of the supporting structure and fastened to the mount 14 by means of three fasteners 14-1 to 14-3 of the first group.

In both of the embodiments, the mounting plate 16 has a central orifice 19 through which the output shaft 12 of the motor, possibly fitted with a crank pin 13, can pass.

Advantageously, the fasteners are molded as an integral part of the mount.

In the example, those fasteners of the first and second groups that delimit said housing for the tube are tapered allowing the tube to be indexed in the housing and secured therein through a wedging effect.

The example described with reference to the figures has the advantage of allowing the design of the mount to be compact in spite of the presence of multiple fasteners.

These multiple fasteners allow one and the same motor to be fastened directly or indirectly to the tube of the supporting structure.

Of course, other embodiments may be imagined in which the housing for the tube is, for example, delimited by three fasteners, two situated on one side of the tube and the third situated on the other side of the tube between the first two. It is also possible to imagine more than three fasteners forming part of the first group.

The invention claimed is:

1. A vehicle windshield wiper motor comprising:
an output shaft;
a device for fastening the output shaft onto a tube of a supporting structure, the fastening device comprising a fastening mount and a mounting plate,
wherein the mount includes at least five fasteners with mutually parallel axes, at least three of the fasteners, which form a first group, being distributed about the output shaft of the motor, and at least two of the fasteners, which form a second group, being arranged a sufficient distance from at least one of the three fasteners of the first group to form a housing configured to house the tube, the housing configured to be closed by the mounting plate, and
wherein the mounting plate, distinct from the tube of the supporting structure, is configured to be fastened at least at one point to the supporting structure and is fastened to the mount by at least two fasteners of the second group and at least one fastener of the first group so as to close the housing that accepts the tube.

2. The motor as claimed in claim 1, wherein the housing is defined by the space formed between two fasteners of the first group and two fasteners of the second group.

3. The motor as claimed in claim 1, wherein the mounting plate is fastened to the mount by at least two fasteners of the second group and at least one fastener of the first group situated on the opposite side of the motor output shaft to the housing.

4. The motor as claimed in claim 1, wherein a part of the mounting plate that closes the housing has a shape that complements a shape of the tube.

5. The motor as claimed in claim 1, wherein the mounting plate includes an orifice through which the motor output shaft, or an orifice fitted with a crank pin, can pass.

6. The motor as claimed in claim 1, wherein the fasteners are molded as an integral part of the mount.

7. The motor as claimed in claim 1, wherein the fasteners of the first and second groups that delimit the housing for the tube are tapered.

8. The motor as claimed in claim 1, wherein the axes of the at least five fasteners are perpendicular to the mounting plate.

9. A vehicle windshield wiper motor assembly comprising:
a supporting structure, including a tube;
an output shaft;
a device that fastens the output shaft onto the tube of the supporting structure, the fastening device comprising a fastening mount and a mounting plate,
wherein the mount includes at least five fasteners with mutually parallel axes, at least three of the fasteners, which form a first group, being distributed about the output shaft of the motor, and at least two of the fasteners, which form a second group, being arranged a sufficient distance from at least one of the three fasteners of the first group to form a housing configured to house the tube, the housing configured to be closed by the mounting plate, and
wherein the mounting plate, distinct from the tube of the supporting structure, is configured to be fastened at least at one point to the supporting structure and is fastened to the mount by at least two fasteners of the second group and at least one fastener of the first group so as to close the housing that accepts the tube.

10. The motor assembly as claimed in claim 9, wherein the tube includes embossings of shapes that complement the fasteners of the motor housing to accept the tube.

\* \* \* \* \*